(12) United States Patent
Yoshimura et al.

(10) Patent No.: US 11,578,185 B2
(45) Date of Patent: Feb. 14, 2023

(54) POLYESTER RESIN COMPOSITION, MOLDED ARTICLE, AND COMPOSITE MOLDED ARTICLE

(71) Applicant: Toray Industries, Inc., Tokyo (JP)

(72) Inventors: Yasunari Yoshimura, Nagoya (JP); Yoshiyuki Honda, Nagoya (JP); Sadanori Kumazawa, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 17/608,575

(22) PCT Filed: Mar. 2, 2021

(86) PCT No.: PCT/JP2021/007803
§ 371 (c)(1),
(2) Date: Nov. 3, 2021

(87) PCT Pub. No.: WO2021/199842
PCT Pub. Date: Oct. 7, 2021

(65) Prior Publication Data
US 2022/0145044 A1 May 12, 2022

(30) Foreign Application Priority Data

Mar. 31, 2020 (JP) .............................. JP2020-063459
Sep. 24, 2020 (JP) .............................. JP2020-159263
Nov. 10, 2020 (JP) .............................. JP2020-186990

(51) Int. Cl.
*C08K 5/098* (2006.01)
*B29B 13/06* (2006.01)
(Continued)

(52) U.S. Cl.
CPC .............. *C08K 5/098* (2013.01); *B29B 13/06* (2013.01); *C08K 3/40* (2013.01); *C08K 5/09* (2013.01);
(Continued)

(58) Field of Classification Search
CPC . C08K 5/098; C08K 5/09; C08K 3/40; C08K 7/14; C08K 7/02; C08K 13/02;
(Continued)

(56) References Cited

U.S. PATENT DOCUMENTS 4,546,126 A 10/1985 Breitenfellner et al.
4,772,652 A 9/1988 Yoshifumi et al.
(Continued)

FOREIGN PATENT DOCUMENTS

CN 103304965 A 9/2013
EP 3 331 775 A1 6/2018
(Continued)

OTHER PUBLICATIONS

Machine translation of JP 2019094441 A to Fujii et al. published Jun. 20, 2019 (Year: 2019).*
(Continued)

*Primary Examiner* — Jane L Stanley
(74) *Attorney, Agent, or Firm* — DLA Piper LLP (US)

(57) ABSTRACT

A composite molded article obtained by laser welding molded article composed of a polyester resin composition having a crystallinity of 15% or more as calculated with fast scanning calorimetry by a calculation method, wherein the calculation method includes using fast scanning calorimetry, the polyester resin composition is heated from 30° C. to 260° C. at 10000° C./second, then maintained at 260° C. for 0.1 second, then cooled to 80° C. at 5000° C./second, maintained at 80° C. for 0.1 second, then cooled to −70° C. at 5000° C./second, and then heated to 260° C. at 1000° C./second, after which the curve obtained is used to calculate the crystallinity.

9 Claims, 2 Drawing Sheets

(51) Int. Cl.
*C08K 3/40* (2006.01)
*C08K 7/14* (2006.01)
*C08K 5/09* (2006.01)
*C08K 7/02* (2006.01)
*B29K 67/00* (2006.01)
*B29C 37/00* (2006.01)

(52) U.S. Cl.
CPC ............... *C08K 7/02* (2013.01); *C08K 7/14* (2013.01); *B29C 37/0092* (2013.01); *B29K 2067/00* (2013.01)

(58) Field of Classification Search
CPC ..... B29B 13/06; B29C 37/0092; B29C 65/00; B29C 65/16; B29C 65/1654; B32B 37/04; B29K 2067/00
See application file for complete search history.

(56) References Cited

U.S. PATENT DOCUMENTS

| | | | |
|---|---|---|---|
| 2004/0232717 A1 | 11/2004 | Ariyasu | |
| 2010/0324220 A1* | 12/2010 | Toyohara | C08L 67/02 525/190 |
| 2011/0256406 A1 | 10/2011 | Farrell et al. | |
| 2012/0231285 A1* | 9/2012 | Von Benten | C08K 5/098 524/502 |
| 2018/0222613 A1 | 8/2018 | Geier et al. | |

FOREIGN PATENT DOCUMENTS

| | | | |
|---|---|---|---|
| JP | S54-90255 A | 7/1979 | |
| JP | 0 078 937 A1 | 5/1983 | |
| JP | S58-101146 A | 6/1983 | |
| JP | S60-38455 A | 2/1985 | |
| JP | S63-130656 A | 6/1988 | |
| JP | H7-173375 A | 7/1995 | |
| JP | H8-41296 A | 2/1996 | |
| JP | 2001-200148 A | 7/2001 | |
| JP | 2003-41099 A | 2/2003 | |
| JP | 2004-300376 A | 10/2004 | |
| JP | 2006-241394 A | 9/2006 | |
| JP | 2010-215827 A | 9/2010 | |
| JP | 2013-53316 A | 3/2013 | |
| JP | 2014-512420 A | 5/2014 | |
| JP | 2019094441 A * | 6/2019 | .............. C08L 67/02 |
| WO | 2019/217680 A1 | 11/1919 | |
| WO | 2003/022926 A1 | 3/2003 | |

OTHER PUBLICATIONS

First Office Action dated Apr. 6, 2022, of counterpart Chinese Patent Application No. 202180003902.9, along with an English translation.

Extended European Search Report dated Jul. 1, 2022, of counterpart European Patent Application No. 21780097.8.

* cited by examiner

POLYESTER RESIN COMPOSITION, MOLDED ARTICLE, AND COMPOSITE MOLDED ARTICLE

TECHNICAL FIELD

This disclosure relates to a polyester resin composition having excellent laser weldability, a molded article, and a composite molded article composed of the molded article(s).

BACKGROUND

Polyester resins, particularly polybutylene terephthalate resins have excellent injection moldability, mechanical characteristics, heat resistance, electrical characteristics, chemical resistance and the like, by virtue of which such resins are widely used for injection molded articles in fields of machine parts, electrical and communications parts, automobile parts and the like. Although such an injection molded article undergoes good molding efficiency, the shape of the article is restricted by the flow characteristics of the resin and the structure of the mold. This restriction makes it difficult to mold a very complicated article.

When the shape of a product is complicated, the parts are conventionally joined with an adhesive, joined mechanically with a bolt or the like, or joined otherwise. However, an adhesive does not yield sufficient strength of adhesion, and in addition, mechanical joining with a bolt or the like is accompanied by problems of cost, fastening labor, and product weight increase. On the other hand, external heat welding methods such as laser welding and hot plate welding and friction heat welding methods such as vibration welding and ultrasonic welding enable joining in a short time. In addition, those welding methods use no adhesive or metal part, and thus do not cause a problem of the cost of such an adhesive or metal part, product weight increase, environmental pollution or the like. Accordingly, such a method of joining is increasingly used.

Laser welding, which is one of the external heat welding methods, is a technique in which resin molded products are superposed one on the other, and exposed to a laser beam, which is transmitted by the one and absorbed by the other so that the resin is melted and fused. That technique enables three-dimensional joining, enables contactless processing, and generates no burr, and by virtue of those advantages, such a technique is propagating in a wide range of fields.

Polybutylene terephthalate resins have high dimensional stability and low water absorbing properties, and thus are used in many various applications. Such resins have a much lower laser beam transmittance than polyamide resins. Accordingly, when a polybutylene terephthalate resin is used for a molded article on the laser beam transmitting side, and where a laser welding technique is applied, the low laser beam transmittance imposes very stringent restrictions on the thickness of the molded article. This demands an approach for decreasing the thickness to enhance the laser beam transmittance, thus causing a low degree of freedom for product design.

Besides the absolute value of the laser beam transmittance, a large variation in transmittance among the parts of the molded article to be used on the laser beam transmitting side can cause a welding defect. Accordingly, to perform laser welding stably, it is desirable to control the transmittance at the parts of the molded article to be used on the laser beam transmitting side. In addition, performing laser welding stably demands controlling the dimensional characteristics of the molded article. In particular, it is desirable to control the amount of warpage of each molded article to decrease a gap and a position shift at the welded portion between the molded article on the laser beam transmitting side and the molded article on the absorbing side.

Against the above-mentioned problems, JP 2014-512420 A discloses a method of adding an alkali metal salt of a fatty acid to a polyester resin to improve the transmission of a laser beam.

In addition, JP 2013-53316 A discloses a method in which a laser transmitting thermoplastic resin having good mechanical strength is obtained by adding a specific glass fiber to a thermoplastic resin.

According to JP '420, the transmittance demanded by laser welding for a molded article is good, but the transmittance is variable, the transmittance varies among the parts of the molded article, and the warpage of the molded article is large. Those influences can cause a welding defect, creating a problem of difficulty in obtaining stable laser welding quality. In addition, a thermoplastic resin disclosed in JP '316 is a polyester resin basically having low laser transmitting properties, and thus, does not have sufficient transmittance. In addition, the injection moldability is problematic. Thus, a laser transmitting material further having excellent productivity is demanded.

In view of this, it could be helpful to provide the following: a polyester resin composition having good injection moldability and excellent mechanical strength and also yields stable laser welding quality achieved through controlling high laser transmitting properties at the parts of a molded article and controlling the dimensional characteristics of the molded article; a molded article produced using this resin composition; and a composite molded article produced using this molded article.

SUMMARY

We thus provide:

A polyester resin composition characterized by having a crystallinity of 15% or more as calculated using fast scanning calorimetry by the following method:

calculation method: using fast scanning calorimetry, the polyester resin composition is heated from 30° C. to 260° C. at 10000° C./second, then maintained at 260° C. for 0.1 second, then cooled to 80° C. at 5000° C./second, maintained at 80° C. for 0.1 second, then cooled to −70° C. at 5000° C./second, and then heated to 260° C. at 1000° C./second, after which the curve obtained is used to calculate the crystallinity.

In addition, a molded article is composed of the above-mentioned polyester resin composition.

In addition, a method produces a molded article, wherein the above-mentioned polyester resin composition is dried at 100° C. or more for three hours or more, and then molded.

In addition, a composite molded article has the above-mentioned molded article(s) welded by laser welding.

The polyester resin composition is characterized by having good injection moldability and excellent mechanical strength and making it possible to control high laser transmitting properties at the parts of a molded article and control the dimensional characteristics of the molded article. Accordingly, such a polyester resin composition is useful for a resin molded product in various applications that involve laser welding, particularly a molded product on the laser transmitting side.

BRIEF DESCRIPTION OF THE DRAWINGS

FIG. 1(a) depicts a front view, and (b) a side view.

FIG. 2(a) depicts a top view, (b) a front view, and (c) the detail of the top view.

REFERENCE SIGNS LIST

1. Sprue
2. Runner
3. Gate
4. Test piece for evaluating laser beam transmitting properties
5. Pin gate
6. Side
7. Amount of inward warpage
8. Test piece for evaluating inward warpage

DETAILED DESCRIPTION

Polyester Resin (A)

Our polyester resin composition contains a polyester resin (A) as a main component. The "main component" refers to the polyester resin (A) in an amount of 30 wt % or more with respect to 100 wt % of the polyester resin composition. The polyester resin (A) is a polymer or a copolymer containing, as a main structural unit(s), one or more selected from (a) a dicarboxylic acid or an ester-forming derivative thereof and a diol or an ester-forming derivative thereof, (b) a hydroxycarboxylic acid or an ester-forming derivative thereof, and (c) a lactone.

Examples of the above-mentioned dicarboxylic acid or ester-forming derivative thereof include: aromatic dicarboxylic acids such as terephthalic acid, isophthalic acid, phthalic acid, 2,6-naphthalenedicarboxylic acid, 1,5-naphthalenedicarboxylic acid, bis(p-carboxyphenyl)methane, anthracenedicarboxylic acid, 4,4'-diphenyletherdicarboxylic acid, 5-tetrabutylphosphoniumisophthalic acid, 5-sodiumsulfoisophthalic acid, and diphenic acid; aliphatic dicarboxylic acids such as oxalic acid, succinic acid, adipic acid, sebacic acid, azelaic acid, dodecanedioic acid, malonic acid, glutaric acid, and dimer acid; alicyclic dicarboxylic acids such as 1,3-cyclohexanedicarboxylic acid and 1,4-cyclohexanedicarboxylic acid; ester-forming derivatives thereof; and the like.

In addition, examples of the above-mentioned diol or ester-forming derivative thereof include: $C_{2-20}$ aliphatic glycols, that is, ethylene glycol, propylene glycol, 1,4-butanediol, neopentyl glycol, 1,5-pentanediol, 1,6-hexanediol, decamethylene glycol, cyclohexane dimethanol, cyclohexane diol, dimer diol and the like; long-chain glycols having a molecular weight of 200 to 100000, that is, polyethylene glycol, poly-1,3-propylene glycol, polytetramethylene glycol, and the like; aromatic dioxy compounds, that is, 4,4'-dihydroxybiphenyl, hydroquinone, t-butylhydroquinone, bisphenol A, bisphenol S, bisphenol F, and bisphenol-C; ester-forming derivatives thereof; and the like.

Examples of (a) the polymer or copolymer containing, as structural units, a dicarboxylic acid or ester-forming derivative thereof and a diol or ester-forming derivative thereof include: aromatic polyester resins such as polyethylene terephthalate, polypropylene terephthalate, polybutylene terephthalate, polycyclohexanedimethylene terephthalate, polyhexylene terephthalate, polyethylene isophthalate, polypropylene isophthalate, polybutylene isophthalate, polycyclohexanedimethylene isophthalate, polyhexylene isophthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate, polybutylene terephthalate/naphthalate, polybutylene terephthalate/decane dicarboxylate, polyethylene terephthalate/cyclohexane dimethylene terephthalate, polyethylene terephthalate/5-sodiumsulfo isophthalate, polypropylene terephthalate/5-sodiumsulfo isophthalate, polybutylene terephthalate/5-sodiumsulfo isophthalate, polyethylene terephthalate/polyethylene glycol, polypropylene terephthalate/polyethylene glycol, polybutylene terephthalate/polyethylene glycol, polyethylene terephthalate/polytetramethylene glycol, polypropylene terephthalate/polytetramethylene glycol, polybutylene terephthalate/polytetramethylene glycol, polyethylene terephthalate/isophthalate/polytetramethylene glycol, polypropylene terephthalate/isophthalate/polytetramethylene glycol, polybutylene terephthalate/isophthalate/polytetramethylene glycol, polyethylene terephthalate/succinate, polypropylene terephthalate/succinate, polybutylene terephthalate/succinate, polyethylene terephthalate/adipate, polypropylene terephthalate/adipate, polybutylene terephthalate/adipate, polyethylene terephthalate/sebacate, polypropylene terephthalate/sebacate, polybutylene terephthalate/sebacate, polyethylene terephthalate/isophthalate/adipate, polypropylene terephthalate/isophthalate/adipate, polybutylene terephthalate/isophthalate/succinate, polybutylene terephthalate/isophthalate/adipate, and polybutylene terephthalate/isophthalate/sebacate; and aliphatic polyester resins such as polyethylene oxalate, polypropylene oxalate, polybutylene oxalate, polyethylene succinate, polypropylene succinate, polybutylene succinate, polyethylene adipate, polypropylene adipate, polybutylene adipate, polyneopentyl glycol adipate, polyethylene sebacate, polypropylene sebacate, polybutylene sebacate, polyethylene succinate/adipate, polypropylene succinate/adipate, and polybutylene succinate/adipate. Among these, aromatic polyester resins are preferable. Any one selected from polyethylene terephthalate, polypropylene terephthalate, and polybutylene terephthalate, or copolymers thereof are more preferable. Polybutylene terephthalate or copolymers thereof are still more preferable.

In addition, examples of (b) the above-mentioned hydroxycarboxylic acid or ester-forming derivative thereof include glycol acid, lactic acid, hydroxypropionic acid, hydroxybutyric acid, hydroxyvaleric acid, hydroxycaproic acid, hydroxybenzoic acid, p-hydroxybenzoic acid, 6-hydroxy-2-naphthoic acid, ester-forming derivatives thereof and the like. Examples of polymers or copolymers containing such an acid or a derivative as a structural unit include aliphatic polyester resins such as polyglycol acid, polylactic acid, polyglycol acid/lactic acid, and polyhydroxybutyric acid/(β-hydroxybutyric acid/β-hydroxyvaleric acid.

In addition, examples of (c) the above-mentioned lactone include ε-caprolactone, valerolactone, propiolactone, undecalactone, 1,5-oxepane-2-one, γ-butyrolactone and the like. Examples of polymers or copolymers containing such a lactone as a structural unit include polycaprolactone, polyvalerolactone, polypropiolactone, poly-γ-butyrolactone, polycaprolactone/valerolactone and the like.

Among these, preferable components are polymers or copolymers containing, as main structural units, (a) a dicarboxylic acid or ester-forming derivative thereof and a diol or ester-forming derivative thereof. More preferable components are polymers or copolymers containing, as main structural units, an aromatic dicarboxylic acid or ester-forming derivative thereof and an aliphatic diol or ester-forming derivative thereof. Still more preferable components are polymers or copolymers containing, as main structural units, a terephthalic acid or ester-forming derivative thereof and an aliphatic diol selected from ethylene glycol, propylene glycol, and butane diol, or an ester-forming derivative thereof. Among these, preferable components are aromatic polyester resins such as polyethylene terephthalate, polypropylene terephthalate, polybutylene terephthalate, polycyclohexanedimethylene terephthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate, and polybutylene terephthalate/naphthalate. Particularly preferable components are polyethylene terephthalate, polypropylene terephthalate, and polybutylene terephthalate. In particular, polybutylene terephthalate is preferable.

The ratio of such a terephthalic acid or ester-forming derivative thereof is preferably 30 mol % or more, still more preferably 40 mol % or more, with respect to all the dicarboxylic acids in the polymer or copolymer containing, as main structural units, (a) the above-mentioned dicarboxylic acid or ester-forming derivative thereof and a diol or ester-forming derivative thereof.

The polyester resin (A) is not limited to any particular viscosity provided that the viscosity enables melt kneading. From the viewpoint of moldability, the intrinsic viscosity measured in an o-chlorophenol solution at 25° C. is preferably 0.36 to 1.60 dl/g, more preferably 0.50 to 1.50 dl/g.

The polyester resin (A) is not limited to any particular melting point provided that the melting point enables melt kneading. The melting point is preferably 200° C. or more from the viewpoints of heat resistance and mechanical strength, more preferably 215° C. or more, still more preferably 220° C. or more, from the viewpoint of excellent melt processability. The melting point is not limited to any particular upper limit, and is preferably 280° C. or less, more preferably 270° C. or less, from the viewpoint of excellent melt processability. The melting point of less than 210° C. causes a problem of a decrease in heat resistance. On the other hand, the melting point of more than 280° C. causes the crystallinity and crystal size to be extremely large, and thus necessitates excessive heating during melt processing, posing a possibility that the polyester resin is concurrently decomposed. In this regard, the melting point mentioned here refers to the peak top temperature of an endothermic peak observed as, using a differential scanning calorimeter (DSC), the resin is heated from 30° C. to 280° C. at a heating rate of 20° C./minute, maintained at 280° C. for three minutes, then cooled from 280° C. to 30° C. at a cooling rate of 20° C./minute, and then heated from 30° C. to 280° C. at a heating rate of 20° C./minute.

The crystal fusion heat expressed by the area of an endothermic peak measured under the above-mentioned conditions using the above-mentioned differential scanning calorimeter (DSC) is preferably 20 J/g or more, more preferably 30 J/g or more, still more preferably 40 J/g or more, from the viewpoint of excellent heat resistance. The upper limit of the crystal fusion heat is not limited to any particular value, and is preferably 60 J/g or less, more preferably 50 J/g or less, from the viewpoint of excellent melt processability.

The polyester resin (A) is not limited to any particular production method, and can be produced by a common polycondensation or ring-opening polymerization method or the like, and such a method may be either batch polymerization or continuous polymerization. In addition, either a method including transesterification reaction and polycondensation reaction or a method including a reaction based on direct polymerization can be applied. Continuous polymerization is preferable from the viewpoints of making it possible to decrease the carboxyl end group amount and providing excellent laser transmitting properties, and direct polymerization is preferable from the viewpoint of cost.

When the polyester resin (A) is a polymer or copolymer that contains, as main components, (a) a dicarboxylic acid or ester-forming derivative thereof and a diol or ester-forming derivative thereof and is obtained by condensation reaction, the polyester resin (A) can be produced by allowing (a) the dicarboxylic acid or ester-forming derivative thereof and the diol or ester-forming derivative thereof to undergo esterification reaction or transesterification reaction, and then polycondensation reaction. In this regard, a polymerization reaction catalyst is preferably added during these reactions to effectively advance the esterification reaction or transesterification reaction and the polycondensation reaction. Specific examples of polymerization reaction catalysts include: organic titanium compounds such as a methyl ester, tetra-n-propyl ester, tetra-n-butyl ester, tetraisopropyl ester, tetraisobutyl ester, tetra-tert-butyl ester, cyclohexyl ester, phenyl ester, benzyl ester, and tolyl ester of a titanic acid, and ester mixtures thereof; tin compounds such as dibutyltin oxide, methylphenyltin oxide, tetraethyltin, hexaethylditin oxide, cyclohexahexylditin oxide, didodecyltin oxide, triethyltin hydroxide, triphenyltin hydroxide, triisobutyltin acetate, dibutyltin diacetate, diphenyltin dilaurate, monobutyltin trichloride, dibutyltin dichloride, tributyltin chloride, dibutyltin sulfide, and butylhydroxytin oxide, and alkyl stannonic acids such as methyl stannonic acid, ethyl stannonic acid, and butyl stannonic acid; zirconia compounds such as zirconium tetra-n-butoxide; antimony compounds such as antimony trioxide and antimony acetate; and the like. Among these, organic titanium compounds and tin compounds are preferable. Furthermore, a tetra-n-propyl ester, tetra-n-butyl ester, and tetraisopropyl ester of a titanic acid are preferable. A tetra-n-butyl ester of a titanic acid is particularly preferable. These polymerization reaction catalysts may be used singly or in combination of two or more kinds thereof. The addition amount of the polymerization reaction catalyst is preferably 0.005 to 0.5 part by mass, more preferably 0.01 to 0.2 part by mass, with respect to 100 parts by mass of the polyester resin from the viewpoints of mechanical characteristics, moldability, and color tone.

The polyester resin (A) can be used singly or in combination of a plurality of kinds thereof.

A polyester resin composition contains the polyester resin (A), and is characterized by having a crystallinity ($X_c$) of 15% or more as calculated in accordance with the below-mentioned equation from a crystal fusion heat ($\Delta H_m$) which is expressed by the area of an endothermic peak observed as, using fast scanning calorimetry, the polyester resin composition is heated from 30° C. to 260° C. at 10000° C./second, then maintained at 260° C. for 0.1 second, then cooled to 80° C. at 5000° C./second, maintained at 80° C. for 0.1 second, then cooled to −70° C. at 5000° C./second, and then heated to 260° C. at 1000° C./second:

$$\text{Crystallinity}(X_c) = \Delta H_m / \Delta H_m^0 \times 100.$$

$\Delta H_m^0$ is the crystal fusion heat of a 100% crystalline polyester resin (A). Having such characteristics results in forming a stable crystal structure in the parts of a molded article even under rapidly cooling conditions in a mold for injection molding. Accordingly, the injection moldability is good, and the parts of the molded article exhibit stable laser transmitting properties. The above-mentioned crystallinity is preferably 15% or more, more preferably 20% or more. The upper limit is not limited to any particular value, and is preferably 60% or less, more preferably 50% or less, from the viewpoint of excellent melt processability. Fast scanning calorimetry refers to a calorimeter having a thermal sensor made minute and thus made capable of high-speed heating and cooling with a sample amount in nanograms. The calorimeter has its limitations in the followable heating and cooling rates depending on the kind and size of a sample, and is capable of the highest heating rate of 10000° C./second and the highest cooling rate of 5000° C./second.

In a resin composition containing the polyester resin (A), the average longitudinal length of the linear structures derived from the crystal structure of the polyester resin (A) is preferably 150 nanometers or less as observed using a transmission electron microscope. The average longitudinal length of the linear structures can be determined by the following method. A resin composition molded to have a thickness of 1 millimeter or more is used to produce a sample cut out of the inside by 50 micrometers or more under the surface. The sample is stained with ruthenium tetroxide, and observed under a transmission electron microscope. The resulting image is made an image having a size of 1 μm×1 μm. From the structures identifiable by shades of color, 10 linear structures are selected randomly, and measured in the longitudinal direction. The average value of the measurements is regarded as the average length. Having such a structure leads to inhibiting a laser beam from diffusing in the resin composition, thus exhibiting good laser transmitting properties. The average longitudinal length of the linear structures is preferably 150 nanometers or less, more preferably 125 nanometers or less, still more preferably 100 nanometers or less. The lower limit is not limited to any particular value, and is preferably 50 nanometers or more so that the heat resistance can be maintained.

In this regard, no particular limitation applies to a method of adjusting the crystallinity of the polyester resin composition to 15% or more and adjusting the average longitudinal length of the linear structures to 150 nanometers or less, as calculated by the above-mentioned procedures. Examples of such a method include a method in which the polyester resin (A) is blended with a metal salt (B).

The polyester resin (A) is not limited to any particular end group, and can have a carboxyl end group, a hydroxyl end group, or an end group other than these. The carboxyl end group concentration is preferably 50 eq/t or less, more preferably 30 eq/t or less, still more preferably 20 eq/t or less, particularly preferably 15 eq/t or less, from the viewpoints of excellent laser transmitting properties and dimensional characteristics.

A polyester resin composition contains the polyester resin (A) as a main component, and preferably contains a metal component. For the polyester resin composition, the ratio expressed by the metal component amount/the carboxyl end group amount is preferably 0.50 or more, more preferably 0.70 or more, still more preferably 0.80 or more, particularly preferably 0.90 or more. In addition, the value of the metal component amount/the carboxyl end group amount is preferably 2.00 or less from the viewpoints of laser transmitting properties and mechanical characteristics. The metal component in the polyester resin is not limited to any particular state, may exist as a simple substance or an ion, may form a metal salt structure or coordinate structure with another compound, and preferably forms a metal salt structure with the carboxyl end group of the polyester resin (A) from the viewpoints of excellent laser transmitting properties and dimensional characteristics. Allowing the ratio between the carboxyl end group amount and the metal component amount in the polyester resin (A) to be in the above-mentioned range leads to enhancing the crystal nucleation efficiency of the polyester resin, making the crystal structure of the injection molded article minute, and thus enhancing the laser transmitting properties. In addition, the crystallization rate is increased. Accordingly, even if the way of being cooled is uneven among the parts of the molded article during injection molding, the difference in crystallinity is smaller among the parts of the molded article, and the difference in the shrinkage rate is decreased, thus making it less likely to cause facial warpage or inward warpage to the resulting molded article. No particular limitation applies to a method of allowing the polyester resin composition to contain a metal component so that the ratio expressed by the metal component amount/the carboxyl end group amount can be 0.50 or more. Examples of such a method include a method in which the polyester resin (A) is blended with the metal salt (B), and a method in which the melt kneading conditions and the injection molding conditions are adjusted. Quantitating the carboxyl end group amount of the polyester resin (A) is not limited to any particular method. Examples of such a method include potentiometric titration, in which the amount is expressed by the number of moles with respect to the weight of the polyester resin (A). Quantitating the metal component is not limited to any particular method. Examples of such a method include atomic absorbance measurement, in which the value expressed by the number of moles with respect to the weight of the polyester resin (A) is used as the metal component amount of the resin composition.

Metal Component

The metal component is not limited to any particular metal species, and may be of any metal species. Examples of such components include metal components selected from lithium, potassium, sodium, magnesium, calcium, aluminium, strontium, titanium, manganese, iron, zinc, silicon, zirconium, yttrium, barium and the like. The component is preferably an alkali metal from the viewpoints of having excellent crystallization characteristics, exhibiting good laser transmitting properties, and having both excellent mechanical characteristics and dimensional characteristics. From the viewpoint of the excellent crystallization promoting effect in particular, the component is more preferably at least one selected from sodium, potassium, and mixtures thereof, still more preferably sodium. Quantitating the metal component is not limited to any particular method. Examples of such a method include atomic absorbance measurement, in which the quantitated value is expressed by the number of moles with respect to the weight of the polyester resin (A).

Metal Salt (B)

It is preferable, from the viewpoint of good crystal nucleation, that the polyester resin composition contains the metal salt (B) so that the metal component concentration can be 50 to 150 eq/t with respect to the weight of the polyester resin. That is, the metal component in the polyester resin composition is preferably derived from the metal salt (B).

The metal salt (B) may be any of an aliphatic carboxylic acid metal salt, alicyclic carboxylic acid metal salt, aromatic carboxylic acid metal salt, sulfonic acid metal salt, amidesulfonic acid metal salt, phosphoric acid metal salt, phosphoric acid ester metal salt, boric acid metal salt and the like, or may be a mixture thereof. From the viewpoint of excellent crystallization characteristics, examples of such a metal salt include one selected from, or a mixture of two or more selected from, $C_{2-50}$ aliphatic carboxylic acid metal salts, $C_{7-60}$ alicyclic carboxylic acid metal salts, $C_{7-60}$ aromatic carboxylic acid metal salts, $C_{1-50}$ aliphatic sulfonic acid metal salts, $C_{6-60}$ alicyclic sulfonic acid metal salts, $C_{6-60}$ aromatic sulfonic acid metal salts, $C_{1-50}$ aliphatic phosphoric acid ester metal salts, $C_{6-60}$ alicyclic phosphoric acid ester metal salts, and $C_{6-60}$ aromatic phosphoric acid ester metal salts. In addition, from the viewpoints of having excellent crystallization characteristics and exhibiting good injection moldability and laser transmitting properties, the metal salt is preferably one selected from, or a mixture of two or more selected from, $C_{2-40}$ aliphatic carboxylic acid metal salts, $C_{7-40}$ alicyclic carboxylic acid metal salts, and $C_{7-40}$ aromatic carboxylic acid metal salts, more preferably one selected from, or a mixture of two or more selected from, $C_{2-30}$ aliphatic carboxylic acid metal salts and $C_{7-30}$ aromatic carboxylic acid metal salts, particularly preferably a $C_{2-25}$ aliphatic carboxylic acid metal salt.

An aliphatic carboxylic acid is a compound in which a carboxylic acid group is added to a straight-chain or branched aliphatic group, and part of the bonds may have another substituent such as an unsaturated group, alicyclic group, hydroxy group, or phosphoric acid ester group.

Preferable examples of aliphatic carboxylic acids include propionic acid, valeric acid, caproic acid, enanthic acid, caprylic acid, pelargonic acid, capric acid, lauric acid, myristic acid, palmitic acid, margaric acid, stearic acid, oleic acid, linoleic acid, montanoic acid and the like.

Furthermore, the metal salt is preferably a $C_{3-20}$ aliphatic carboxylic acid metal salt, more preferably a $C_{3-10}$ aliphatic carboxylic acid metal salt, particularly preferably a $C_{3-5}$ aliphatic carboxylic acid metal salt, from the viewpoint of good affinity with the polyester resin (A).

The metal salt (B) is not limited to any particular metal species, and may be of any metal species. Examples of such metal salts include metal salts selected from lithium, potassium, sodium, magnesium, calcium, aluminium, strontium, titanium, manganese, iron, zinc, silicon, zirconium, yttrium, barium and the like. The metal salt is preferably an alkali metal salt from the viewpoints of having excellent crystallization characteristics, exhibiting good laser transmitting properties, and having both excellent mechanical characteristics and dimensional characteristics. From the viewpoint of the excellent crystallization promoting effect in particular, the metal is more preferably at least one selected from sodium, potassium, and mixtures thereof, still more preferably sodium.

The compounded amount of the metal salt (B) is preferably based on the metal component contained at a concentration of 50 to 150 millimoles with respect to 1 kg of the polyester resin (A). That is, it is preferable that the metal component is contained at a concentration of 50 to 150 eq/t with respect to the weight of the polyester resin. The concentration of 50 eq/t or more makes it possible to maintain the laser transmitting properties of a molded article composed of the polyester resin composition, and makes it possible to inhibit the variation in transmittance among the parts of the molded article. In addition, the concentration of 150 eq/t or less makes it possible to inhibit a decrease in the molecular weight and a decrease in the mechanical strength of the molded article from being caused by the decomposition of the polyester resin (A) under the catalysis of the metal salt. The compounded amount of the metal salt (B) is preferably a concentration of 50 to 150 eq/t, more preferably a concentration of 50 to 120 eq/t, still more preferably a concentration of 50 to 100 eq/t, with respect to the weight of the polyester resin (A).

The metal salt (B) to be preferably used is an aliphatic sodium carboxylate salt that is at least one selected from sodium propionate, sodium caprylate, sodium stearate, and mixtures thereof. Using such a compound containing sodium makes it possible to obtain a high effect of enhancing the laser transmitting properties.

Inorganic Filler

To the extent that the desired effects are not impaired, our compositions can have an inorganic filler blended in. Examples of such components include: fibrous reinforced materials such as glass fibers, carbon fibers, potassium titanate whiskers, zinc oxide whiskers, aluminium borate whiskers, aramide fibers, alumina fibers, silicon carbide fibers, ceramic fibers, asbestos fibers, gypsum fibers, and metallic fibers; silicic acid salts such as wollastonite, zeolite, sericite, kaolin, mica, clay, pyrofilaments, bentonite, asbestos, talc, and alumina silicate; metal compounds such as alumina, silicon oxide, magnesium oxide, zirconium oxide, titanium oxide, and iron oxide; carbonic acid salts such as calcium carbide, magnesium carbonate, and dolomite; sulfuric acid salts such as calcium sulfate and barium sulfate; nonfibrous reinforced materials such as glass beads, ceramic beads, boron nitride, silicon carbide, zinc borate, and silica; and the like. These can be used singly or in combination of two or more kinds thereof. Preferable examples include glass fibers. Furthermore, using such a filler preliminarily treated with a coupling agent such as of silane, epoxy, or titanate is more preferable from the viewpoint of mechanical strength or the like.

Glass Fiber (C)

An inorganic filler to be blended in is preferably a glass fiber (C). The glass fiber (C) may have a cross section that is either circular or flat, and the cross-sectional shape is preferably flat from the viewpoints of inhibiting the deformation, decreasing the warpage, affording stable laser transmitting properties and the like. When a resin composition having glass fibers blended therein is molded, the fibers are generally oriented in the flow direction of the resin, thus increasing the anisotropy of the molding shrinkage rate (the percentage of a difference in dimensions between the resin molded article and the mold), and increasing the deformation and the warpage. However, when the cross-sectional shape is flat, the anisotropy of the molding shrinkage rate is small, and thus makes it more likely to improve the deformation and the warpage.

For the glass fiber (C) having a flat cross-sectional shape, it is preferable that a cross section cut out of the glass fiber perpendicularly to the longitudinal direction has a flatness ratio of 1 or more and 10 or less as expressed by the ratio of the major axis (the longest direct distance of the cross section) to the minor axis (the longest direct distance in the direction perpendicular to the major axis). The lower limit value of the flatness ratio is preferably more than 1, more preferably 1.3 or more, still more preferably 1.5 or more. In addition, the upper limit value is preferably 5 or less, more preferably 2.5 or less, most preferably 2 or less. Specifically, the shape may be any of a cocoon-like shape, ellipse, oval, semicircle, circular arc, rectangle, or any shape similar to these, and is particularly preferably an ellipse from the viewpoints of flowability and low warpage.

The flatness ratio of more than 1 leads to inhibiting deformation and warpage during molding, and 10 or less makes the production itself of such a glass fiber realistically difficult. In addition, it is also possible to use a hollow fiber as the glass fiber (C), for example, to make the specific gravity smaller. The glass fiber (C) having a larger cross-sectional area makes it more difficult to obtain a sufficient reinforcing effect. On the other hand, the glass fiber having an excessively small cross-sectional area causes a problem in that such a glass fiber itself is difficult to produce and handle. The glass fiber (C) preferably has a cross-sectional area of $2 \times 10^{-5}$ to $8 \times 10^{-3}$ mm$^2$, more preferably $8 \times 10^{-5}$ to $8 \times 10^{-3}$ mm$^2$, still more preferably $8 \times 10^{-5}$ to $8 \times 10^{-4}$ mm$^2$. The glass fiber is not limited to any particular length, and is preferably shorter to decrease the amount of deformation of the molded article, depending on the even balance between the mechanical characteristics of the molded article and the inhibition of the deformation. The fiber length is preferably 30 μm or more from the viewpoint of the mechanical characteristics, preferably 50 to 1000 μm in accordance with the capability demanded. The glass fiber (C) is preferably treated using a sizing agent or surface treatment agent, if necessary. Examples of sizing agents or surface treatment agents include functional compounds such as epoxy compounds, isocyanate compounds, silane compounds, and titanate compounds. Such a compound may be preliminarily used for surface treatment or sizing treatment, or be simultaneously added during material preparation. When the glass fiber (C) is flat, such a glass fiber is produced by spinning using a nozzle having a suitable opening in the shape of an ellipse, oval, rectangle, slit, or the like as a bushing to be used to discharge molten glass. In addition, such production can be done by spinning molten glass out through a plurality of nozzles provided in close vicinity to each other and having a kind of cross-sectional shape (examples of which include a circular cross section), and by joining the spun molten glass threads to form a single filament.

The compounded amount of the glass fiber (C) is preferably more than 0 part by mass and 100 parts by mass or less, more preferably 10 to 80 parts by mass, still more preferably 20 to 50 parts by mass, with respect to 100 parts by mass of the polyester resin (A). The glass fiber (C) is preferably blended in to express mechanical strength and low warpage. In addition, the amount of 100 parts by mass or less makes it possible to maintain the flowability during molding.

Another Additive

To the extent that the desired effects are not impaired, our resin compositions can contain another component, examples of which include: epoxy resins (bisphenol A, novolac type, glycidyl ester, and the like), phosphorus stabilizers (phosphoric acid esters and the like), weathering agents (resorcinol, salicylate, benzotriazole, benzophenone, hindered amine and the like), lubricants (montanoic acid and esters thereof, half esters thereof, stearyl alcohol, stearamide, various bisamides, bisureas, polyethylene wax and the like), pigments (cadmium sulfide, phthalocyanine, rylene, perylene, naphthatocyanine, quinacridone, carbon black, titanium oxide, iron oxide, azo and monoazo pigments and the like), dyes (azine, azo dyes, perylene, anthraquinone and the like), crystal nucleating agents (talc, polyetherether ketone and the like), plasticizers (octyl p-hydroxybenzoate, N-butylbenzenesulfonamide and the like), antistatic agents (alkylsulfate type anion antistatic agents, quaternary ammonium salt type cationic antistatic agents, nonionic antistatic agents such as polyoxyethylene sorbitan monostearate, betaine amphoteric antistatic agents and the like), flame retardants (for example, red phosphorus, melamine cyanulate, polyammonium phosphate, polystyrene bromide, polyphenylene bromide ether, polycarbonate bromide, brominated epoxy resins, combinations of these bromine flame retardants and antimony trioxide and the like), color protection agents (phosphoric acid, phosphorous acid, phosphoric acid compounds such as trimethyl phosphate and triphenyl phosphate and the like), other polymers and the like.

Our resin composition is not limited to any particular production method provided that the requirements discussed herein are satisfied. Examples of such a method to be preferably used include: a method in which the polyester resin (A), the metal salt (B), the glass fiber (C), and, if necessary, another component(s) are uniformly melt-kneaded using a single-screw or twin screw extruder; and a method in which mixing such materials in a solution is followed by removing the solvent; and the like. From the viewpoint of productivity, a method including melt-kneading uniformly with a single-screw or twin screw extruder is preferable, and from the viewpoint of making it possible to obtain a resin composition having excellent flowability and mechanical characteristics, a method including melt-kneading uniformly with a twin screw extruder is more preferable. Among these, a particularly preferable method includes melt-kneading with a twin screw extruder that satisfies L/D>30, wherein L is the screw length, and D is the screw diameter. The screw length refers to the length between the position where the raw materials are supplied at the root of the screw and the end of the screw. The upper limit of L/D of a twin screw extruder is 150, L/D is preferably more than 30, and such an extruder having an L/D value of 100 or less can be used.

In addition, the screw configuration of a twin screw extruder is based on the use of a combination of full flight screws and kneading discs, and uniform kneading with the screws is necessary to obtain our resin composition. Accordingly, the ratio of the total length (kneading zone) of the kneading discs with respect to the full length of the screw is preferably 5 to 50%, still more preferably 10 to 40%.

When melt kneading is performed, examples of methods of supplying the components include: a method in which, using an extruder having two feed positions, the polyester resin (A), the metal salt (B), the glass fiber (C), and, if necessary, another component(s) are supplied through the main feed position disposed on the root side of the screw; a method in which the polyester resin (A), the metal salt (B), and the another component(s) are supplied through the main feed position, and the glass fiber (C) is supplied through the sub feed position disposed between the main feed position and the end of the extruder, after which the materials are melt-mixed; and the like.

Additionally, when melt kneading is performed, the temperature of the resin discharged out of the extruder is preferably 310° C. or less, more preferably 300° C. or less, still more preferably 290° C. or less, particularly preferably 280° C. or less, from the viewpoint of making it possible to obtain a resin composition having excellent laser transmitting properties and mechanical characteristics. In addition, the temperature is preferably 200° C. or more, more preferably 210° C. or more, still more preferably 220° C. or more, particularly preferably 230° C. or more, from the viewpoint of processability. The temperature of the resin discharged out of the extruder can be adjusted by the setting of the cylinder temperature, the number of rotations of the screw, and the amount of discharge, and such setting is not limited to any particular method.

Our resin composition can be molded using any usually known method such as injection molding, extrusion molding, blow molding, press molding, or spinning, and can be processed into any kind of molded article and thus utilized. Injection molding is preferable from the viewpoints of cost and excellent high-volume productivity. The molding is not limited to any particular condition, and the polyester resin composition is preferably dried at a temperature of 100° C. or more for three hours or more before molding. The cylinder temperature of a molding machine is not limited to any particular value, and is preferably 270° C. or less, more preferably 260° C. or less, still more preferably 250° C. or less. In addition, the lower limit is preferably 200° C. or more, more preferably 210° C. or more, still more preferably 220° C. or more. In addition, the resin composition is preferably molded such that the residence time of the polyester resin composition inside a molding machine is less than 15 minutes. Molding the resin composition as above-mentioned leads to inhibiting the carboxyl end group amount from being increased by the hydrolysis of the polyester resin composition in the molding step, thus makes it possible to obtain a molded article having excellent laser transmitting properties, mechanical characteristics, and dimensional characteristics. The molding temperature is not limited to any particular value, and is preferably 40° C. or more, preferably 60° C. or more, preferably 80° C. or more, from the viewpoint of more easily controlling transmittance among the parts of the molded article. The upper limit is preferably 100° C. or less from the viewpoint of decreasing the processing time. The injection rate is not limited to any particular value, and is preferably set at 10 mm/sec to 300 mm/sec, more preferably 50 mm/sec to 200 mm/sec, from the viewpoint that the resin is inhibited from being decomposed by shear heating during molding, and at the same time, that the transmittance is more easily controlled among the parts of the molded article.

Examples of molded articles for which the composition can be utilized include injection molded articles, extrusion-molded articles, blow-molded articles, films, sheets, fibers and the like. Examples of such films include various kinds of films such as unstretched, uniaxially-stretched, and biaxially-stretched films. Examples of such fibers include various kinds of fibers such as unstretched yarn, stretched yarn, and superstretched yarn.

The above-mentioned various kinds of molded articles can be utilized in various applications such as automobile parts, electric and electronic parts, construction components and materials, various containers, daily necessities, household sundries, and sanitary articles. In particular, because of the laser weldability, such molded articles are suitable for automobile parts and electric and electronic parts that undergo laser welding.

Our resin composition can be used in the following specific applications. Such specific examples include: underhood parts for automobiles such as air flow meters, air pumps, thermostat housings, engine mounts, ignition bobbins, ignition cases, clutch bobbins, sensor housings, idle speed control valves, vacuum switching valves, ECU housings, vacuum pump cases, inhibitor switches, rotation sensors, accelerator sensors, distributor caps, coil bases, actuator cases for ABS, tops and bottoms of radiator tanks, cooling fans, fan shrouds, engine covers, cylinder head covers, oil caps, oil pans, oil filters, fuel caps, fuel strainers, distributor caps, paper canister housings, air cleaner housings, timing belt covers, brake booster parts, various cases, various tubes, various tanks, various hoses, various clips, various valves, and various pipes; interior parts for automobiles such as torque control levers, safety belt parts, register blades, washer levers, wind regulator handles, wind regulator handle knobs, passing light levers, sun visor brackets, and various motor housings; exterior parts for automobiles such as roof rails, fenders, garnishes, bumpers, door mirror stays, spoilers, hood louvers, wheel covers, wheel caps, grille apron cover frames, lamp reflectors, lamp bezels, and door handles; various connectors for automobiles such as wire harness connectors, SMJ connectors, PCB connectors, and door grommet connectors; electrical connectors; relay cases; coil bobbins; optical pickup chassis; motor cases; notebook personal computer housings and internal parts; CRT display housings and internal parts; printer housings and internal parts; housings and internal parts for portable terminals such as cellular phones, mobile computers, and handheld mobiles; housing and internal parts for storage media drives (for CD, DVD, PD, FD, and the like); photocopying machine housings and internal parts; facsimile housings and internal parts; and electric and electronic parts typified by parabolic antennas and the like.

Further examples include: VTR parts; television parts; irons; hair dryers; rice cooker parts; microwave oven parts; acoustic parts; and parts of video equipment such as video cameras and projectors; substrates of optical storage media such as laser discs (registered trademark), compact discs (CD), CD-ROMs, CD-Rs, CD-RWs, DVD-ROMs, DVD-Rs, DVD-RWs, DVDRAMs, blu-ray discs; household and office appliance parts typified by lighting parts, refrigerator parts, air-conditioner parts, typewriter parts, and word processor parts; and the like.

Examples of other useful applications include: housings and internal parts of electronic musical instruments, home-use game consoles, handheld game consoles, and the like; various gears; various cases; electric and electronic parts such as sensors, LEP lamps, connectors, sockets, resistors, relay cases, switches, coil bobbins, capacitors, variable capacitor cases, optical pickups, oscillators, various terminal boards, transformers, plugs, printed wiring boards, tuners, speakers, microphones, headphones, small motors, magnetic head bases, power modules, semiconductors, liquid crystal, FDD carriages, FDD chassis, motor brush holders, transformer components, and coil bobbins; construction components and materials such as sliding door rollers, blind curtain parts, pipe joints, curtain liners, blind parts, gas meter parts, water meter parts, water heater parts, roof panels, heat-insulating walls, adjusters, floor posts, ceiling suspenders, stairways, doors, and floors; fisheries-related articles such as fishing lines, fishing nets, seaweed culture nets, and fish bait bags; civil engineering-related articles such as vegetation nets, vegetation mats, weed growth prevention bags, weed growth prevention nets, protection sheets, slope protection sheets, ash-scattering prevention sheets, drain sheets, water-holding sheets, sludge dewatering bags, and concrete forms; machine parts such as gears, screws, springs, bearings, levers, key stems, cams, ratchets, rollers, water supply parts, toy parts, fans, guts, pipes, washing tools, motor parts, microscopes, binoculars, cameras, and timepieces; agricultural articles such as multi-films, tunnel films, bird sheets, vegetation protective nonwoven fabrics, seedling raising-pots, vegetation piles, seed tapes, germination sheets, house lining sheets, agricultural vinyl film fasteners, slow-acting fertilizers, root protection sheets, horticultural nets, insect nets, seedling tree nets, printed laminates, fertilizer bags, sample bags, sand bags, animal damage preventive nets, attracting ropes, and windbreak nets; sanitary articles such as paper diapers, sanitary napkin packing materials, cotton swabs, rolled damp hand towels, and toilet seat-wiping paper sheets; medical articles such as medical nonwoven fabrics (suture region reinforcements, adhesion prevention films, artificial organ repairing materials), wound covers, wound bandages, plaster ground fabrics, surgery sutures, fracture reinforcements, and medical films; packaging films of calendars, stationary, clothing, foods and the like; containers and tableware such as trays, blisters, knives, forks, spoons, tubes, plastic cans, pouches, containers, tanks, and baskets; containers and packages such as hot fill containers, microwave oven cooking container, cosmetics containers, wrapping sheets, foam cushioning materials, paper laminates, shampoo bottles, beverage bottles, cups, candy packs, shrinkable labels, cover materials, window envelopes, fruit baskets, tearable tapes, easy peel packages, egg packs, HDD packages, compost bags, recording medium packages, shopping bags, and electric/electronic part wrapping films; various clothing articles such as natural fiber-composite materials, polo shirts, T shirts, innerwear, uniforms, sweaters, socks and stockings, and neckties; interior articles such as curtains, chair covering fabrics, carpets, table cloths, futon mattress wrapping fabrics, wallpapers, and wrapping cloths; hot melt binders for carrier tapes, printed laminates, heat sensitive stencil printing films, mold releasing films, porous films, container bags, credit cards, ATM cards, ID cards, IC cards, papers, leathers, and nonwoven fabrics; binders for powders such as magnetic materials, zinc sulfide, and electrode materials; optical elements; electrically-conductive embossed tapes; IC trays; golf tees; waste bags; plastic shopping bags; various nets; tooth brushes; stationery; drain nets; body towels; hand towels; tea packs; drain filters; clear file folders; coating materials; adhesives; briefcases; chairs; tables; cooler boxes; rakes; hose reels; plant pots; hose nozzles; dining tables; desk surfaces; furniture panels; kitchen cabinets; pen caps; and gas lighters.

Our resin composition has not only high laser transmitting properties and laser weldability but also good mechanical characteristics, dimensional characteristics, and injection moldability, and thus, is useful particularly for various automobile parts and electric and electronic parts that undergo laser welding, among the above-mentioned applications.

In laser welding applications, a molded article that is composed of a resin composition having laser transmitting properties and is used as a laser transmitting member needs to make it possible to control high laser transmitting properties at the parts of the molded article to a high degree. Having high transmitting properties makes it possible to transfer energy to the welded face efficiently, and thus makes it possible to enhance the productivity of laser welding. Laser transmitting properties are expressed, for example, by laser transmittance measured using a spectrophotometer and the like, and calculated as a ratio between the amount of incident light and the amount of transmitted light which result from light having a specific wavelength and made incident on a molded article. For example, when the molded article has a thickness of 2 mm, the laser transmittance at a wavelength of 940 nm is preferably 20% or more, more preferably 25% or more, still more preferably 30% or more. Furthermore, allowing laser transmitting properties to be controlled at the parts of a molded article to a high degree makes it less likely to cause a welding defect and makes it possible to obtain stable laser welding quality. This can be evaluated by the stability of laser transmitting properties. In a specific example in which transmittance is measured at different parts of a molded article, the variation in the laser transmitting properties is evaluated as a variation ratio obtained by dividing a difference in transmittance between the largest value and the smallest value by the average value of transmittance. The variation ratio is preferably 20% or less, more preferably 15% or less, still more preferably 10% or less, particularly preferably 5% or less.

In addition, a molded article to be used for laser welding needs to make it possible that the dimensional characteristics are controlled. In particular, when the amount of warpage of a molded article is large, a gap or a position shift is more likely to be generated at the welded portion between the molded article on the laser beam transmitting side and the molded article on the absorbing side, thus making it more unlikely to obtain stable laser welding quality. The amount of warpage of a molded article can be evaluated, for example, by the amount of inward collapse of a face of a box-like molded article, that is, the amount of inward warpage expressed by the largest dimensions of recess in the original flat face. When the evaluation is performed using a box-like molded article having a 30 mm square bottom face and a height of 30 mm, the amount of warpage is preferably 0.60 mm or less, more preferably 0.50 mm or less, particularly preferably 0.45 mm or less.

A molded article composed of a polyester resin composition can obtain stable laser transmitting properties, and thus, can be suitably used for a composite molded article formed by laser welding the former molded article and another molded article. A molded article can be used, as a constituent material of a composite molded article, either on the laser transmitting side or the laser absorbing side, and is preferably used on the laser transmitting side in particular, because of having stable laser transmitting properties. The material to be used on the laser absorbing side is not limited to any particular material, and is preferably a resin composition having the same composition, or a resin composition having the same kind of resin, as the resin composition on the laser transmitting side has, from the viewpoint of being more likely to be welded more firmly to the material on the laser transmitting side. In addition, the resin composition preferably contains, as a laser beam absorber, carbon black or a pigment or dye that has an absorption band in the laser beam wavelength range, from the viewpoint of making it possible to absorb a laser beam efficiently, and convert the beam to thermal energy. The laser beam absorber is preferably contained in an amount of 0.1 part by mass to 1.0 part by mass with respect to 100 parts by mass of the resin component.

The laser welded portion is not limited to any particular form. Examples of such a form include: a form in which the face on the transmitting side is in contact with the face on the absorbing side; a fitting form in which the transmitting side is a recessed rail, and the absorbing side is a salient rib. In particular, making the welded portion in the form of a salient fitted into a recess makes the alignment easy. In addition, the salient rib is melted and crushed during laser welding, thus making it possible that the molten condition of the resin during laser welding is controlled with reference to the amount of sink of the whole molded article. Accordingly, such a fitting form is preferable from the viewpoint of quality control.

A light source to be used for laser welding is not limited to any particular kind, and examples of light sources include diode laser and fiber laser. The wavelength is preferably 800 nm to 1200 nm.

Laser welding can be performed under arbitrarily selected conditions. For example, conditions such as a laser output, a laser scanning rate, a laser exposure diameter, the number of times of laser exposure, a pressing load on the material on the transmitting side and the material on the absorbing side, and the pressure dwelling time can be adjusted on the basis of a balance with the welding strength, hermetic quality, production cycle time, and the like. The laser output is not limited to any particular value, and is preferably 200 W or less, more preferably 150 W or less, still more preferably 100 W or less, from the viewpoint of inhibiting deterioration due to the overheat and thermal decomposition of the resin. The laser scanning rate is not limited to any particular value, and is preferably 10 mm/sec or more from the viewpoint of inhibiting deterioration due to the overheat and thermal decomposition of the resin, preferably 5000 mm/sec or less from the viewpoint of making it possible that the energy radiated from the laser is transmitted to the resin efficiently. The laser exposure diameter is not limited to any particular value, and is preferably set such that the exposure diameter is 0.5 time to 1.5 times, more preferably 0.7 times to 1.3 times the thickness of the welded portion, from the viewpoint of making it possible to heat the welded portion efficiently. The number of times of laser exposure is not limited to any particular value. Examples of scanning methods include a method based on scanning once and a method based on scanning two or more times. A method based on scanning two or more times is preferable from the viewpoints of making it possible to heat the temperature of the welded portion stepwise, and making it less likely to cause a welding defect. The pressing load on the material on the transmitting side and the material on the absorbing side is not limited to any particular value, and is preferably 2000 N or less, more preferably 1750 N or less, still more preferably 1500 N or less, from the viewpoint of inhibiting the stress applied to the molded article. The lower limit value is preferably 50 N or more, more preferably 75 N or more, still more preferably 100 N or more, from the viewpoint of making it easier that the material on the transmitting side is closely attached to the material on the absorbing side. In addition, the method of pressing the material on the transmitting side and the material on the absorbing side is not limited to any particular method. Examples of such methods include: a method in which the welded portion is pressed directly with glass which easily transmits a laser beam; a method in which the inside or outside of the material at and around the laser welded portion is pressed using a special jig or the like. The pressure dwelling time is not limited to any particular value, and is preferably set in the range of from 0 sec to 20 sec from the viewpoint of making it possible to shorten the production cycle time.

Examples

Next, our resin compositions, molded articles and methods will be described in further detail with reference to Examples, but this disclosure is not limited to these Examples.

The abbreviations and details of the main raw materials used in Examples will be listed below.
(A) Polyester Resin
A-1: polybutylene terephthalate (carboxyl end group amount, 50 eq/t)
A-2: polybutylene terephthalate (carboxyl end group amount, 30 eq/t)
A-3: polybutylene terephthalate (carboxyl end group amount, 15 eq/t)
A-4: polybutylene terephthalate (carboxyl end group amount, 9 eq/t)
(B) Metal Salt
B-1: sodium propionate (carbon number, 3; molecular weight, 96)
B-2: sodium caprylate (carbon number, 8; molecular weight, 166)
B-3: sodium stearate (carbon number, 18; molecular weight, 306)
B-4: potassium stearate (carbon number, 18; molecular weight, 326)
B-5: magnesium stearate (carbon number, 36; molecular weight, 591)
B-6: sodium formate (carbon number, 1; molecular weight, 68)
B-7: sodium polyacrylate (carbon number of repeating unit, 3; molecular weight of repeating unit, 94)
(C) Glass Fiber
C-1: round cross-section chopped strand type glass fiber (fiber diameter, 13 μm; flatness ratio, 1)
C-2: elliptic cross-section chopped strand type glass fiber (fiber minor axis, 10 μm; fiber major axis, 20 μm; flatness ratio, 2)
C-3: elliptic cross-section chopped strand type glass fiber (fiber minor axis, 7 μm; fiber major axis, 28 μm; flatness ratio, 4)

In addition, the evaluation methods used in Examples and Comparative Examples will be described below.
(1) Crystallinity A 100- to 500-nanogram test piece having a suitable size was cut out of resin pellets of the polyester resin composition, and used for fast scanning calorimetry and crystallinity calculation in accordance with the below-mentioned temperature program. A tester used was Flash DSC 1 manufactured by Mettler-Toledo International Inc., and data processing software used was STARe Software manufactured by Mettler-Toledo International Inc. The crystallinity was expressed in percentages by the ratio between the crystal fusion heat obtained by the fast scanning calorimetry and the crystal fusion heat of the perfect crystal. The higher the crystallinity, the better the injection moldability and the laser transmitting properties.

Figure 1A:
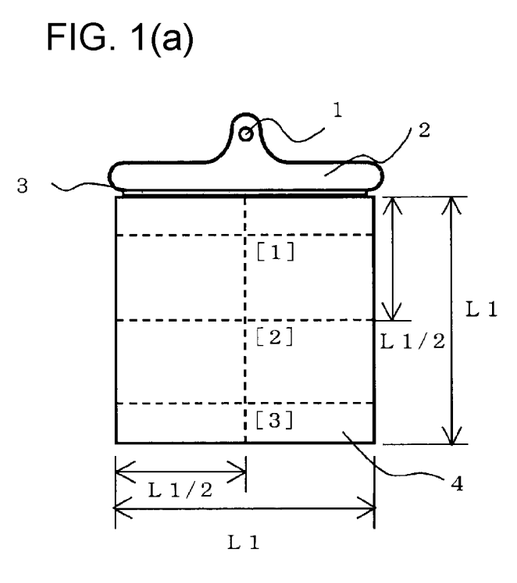
FIGS. 1(a) and (b) depict a plate-like test piece that has a side length L1 of 80 mm and a thickness D1 of 2 mm and is used for evaluation of laser beam transmission.
Figure 1B:
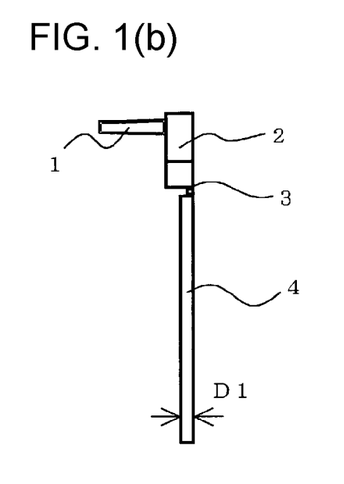

Temperature Program:
[1] heated from 30° C. to 260° C. at 10000° C./second,
[2] maintained at 260° C. for 0.1 second,
[3] cooled to 80° C. at 5000° C./second,
[4] maintained at 80° C. for 0.1 second,
[5] cooled to 5000° C. at −70° C./second, and
[6] heated to 1000° C. at 260° C./second.
(2) Average Length of Linear Structures As depicted in FIG. 1, a square test piece having a side L of 80 mm and a thickness D of 2 mm was molded to evaluate the laser beam transmitting properties. The molding conditions included a cylinder temperature of 260° C. and a mold temperature of 80° C. The sprue 1 and runner 2 portions of the molded piece depicted in FIG. 1 were cut off at a gate 3. From the inside 1 mm in the thickness direction of the central portion of the resulting test piece, a thin slice having a thickness of 100 nanometers was produced, using a focused ion beam device/scanning electron microscope composite (SMI3200SE) manufactured by SII Nano Technology, Inc., a microsampling system (FB-2000A) manufactured by Hitachi High-Tech Corp., and a focused ion beam device/scanning electron microscope composite (Strata 400S) manufactured by FEI. The thin slice was stained with ruthenium tetroxide, and the resulting piece was used as a sample. The resulting sample was observed under conditions at an acceleration voltage of 300 kV at 20000× using a high-resolution transmission electron microscope (H9000UHR) manufactured by Hitachi, Ltd. The resulting image was made an image having a size of 1 μm×1 μm. Ten linear structures identifiable by shades of color were randomly selected, and measured in the longitudinal direction, and the average length was calculated.

(3) Laser Beam Transmitting Properties

As depicted in FIG. 1, a square test piece having a side L1 of 80 mm and a thickness D1 of 2 mm was molded to evaluate the laser beam transmitting properties. The molding conditions included a cylinder temperature of 260° C. and a mold temperature of 80° C. The sprue 1 and runner 2 portions of the molded piece depicted in FIG. 1 were cut off at a gate 3, and the remaining portion was used as a test piece 4 for evaluating the laser beam transmitting properties. A tester used was an ultraviolet and near-infrared spectrophotometer (UV-3150) manufactured by Shimadzu Corp., and, a detector used was an integrating sphere. The transmittance is expressed in percentages by the ratio between the amount of transmitted light and the amount of incident light. As depicted in FIG. 1, the measurement spots were three spots [1] to [3]. The spots [1] and [3] were the portions 13 mm inward from the respective ends of the molded piece, and [2] was the central portion of the molded article. Tables that list Examples and Comparative Examples include the laser transmitting properties expressed by the average of beam transmittance values measured at three spots with near-infrared light in the wavelength region of 940 nm, and the ratio of variation in transmittance expressed by the following equation as a variation in laser transmission:

Ratio of variation in transmittance =
(largest transmittance value − smallest transmittance value)/average transmittance value × 100.

(4) Carboxyl End Group Amount of Polyester Resin (A)

The laser beam transmitting properties evaluation test piece described in (3) was dissolved in 1,1,1,3,3,3-hexafluoro-2-propanol, and centrifuged. The insoluble components were removed to extract the resin component. Approximately 0.4 g of the resin component was dissolved in 20 mL of benzyl alcohol under heating in an oil bath at 100° C. To the resulting solution, 60 mL of chloroform and 20 mL of benzyl alcohol were gradually added, and the resulting mixture was rapidly cooled. Then, a potentiometric titration device (AT-500N) manufactured by Kyoto Electronics Industry Co., Ltd. was used for potentiometric titration with 0.01 mol/L of sodium hydroxide benzyl alcohol solution, and the resulting inflection point was used as the endpoint. A blank test was performed by the same method to calculate the carboxyl end group amount (unit: eq/t) as the number of moles with respect to the weight of the polyester resin (A).

(5) Metal Component Amount of Polyester Resin Composition

The laser beam transmitting properties evaluation test piece described in (3) was dissolved in 1,1,1,3,3,3-hexafluoro-2-propanol, and centrifuged. The insoluble components were removed to extract the resin component. This resin component was ashed, and the resulting ashed product was dissolved in 6 N hydrochloric acid to prepare a solution. This solution was used for atomic absorbance measurement using an atomic absorption spectrophotometer (ZA3300) manufactured by Hitachi High-Tech Corp., and the metal component amount (unit: eq/t) was calculated as the number of moles with respect to the weight of the polyester resin (A).

(6) Tensile Strength

In accordance with ISO527-1,2, an ISO 1A dumbbell test piece molded at a cylinder temperature of 260° C. and at a mold temperature of 80° C. was subjected to tensile strength measurement under conditions at a test rate of 5 mm/min using a tensile tester (Autograph AG50kNX Plus) manufactured by Shimadzu Corp.

(7) Amount of Inward Warpage

Figure 2A:
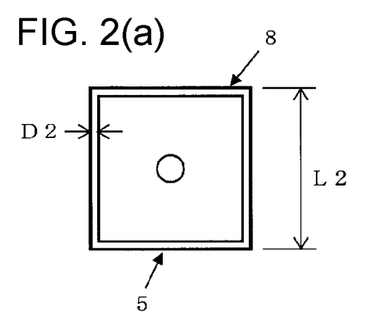
FIGS. 2(a)-(c) depict a box-like test piece that has a square bottom having a side length L2 of 30 mm, has a height H2 of 30 mm and a thickness D2 of 1.5 mm, and is used for evaluation of inward warpage.
Figure 2B:
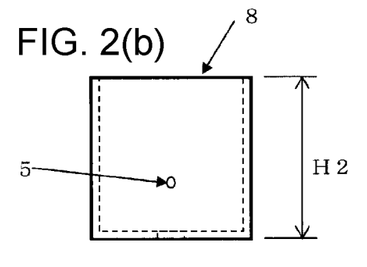
Figure 2C:
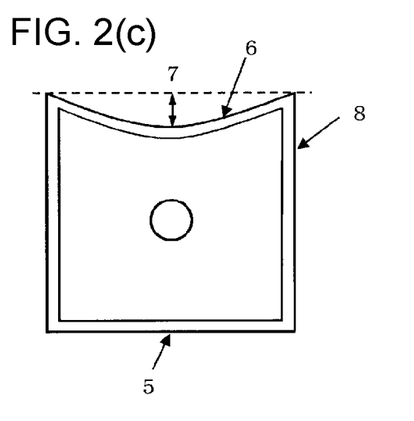

As depicted in FIG. 2, a box-like test piece that had a bottom (square) having a side length L2 of 30 mm, and had a height H2 of 30 mm and a thickness D2 of 1.5 mm was molded and used for evaluation of inward warpage. The molding conditions included a cylinder temperature of 260° C. and a mold temperature of 80° C. The sprue and runner were cut off at a pin gate 5, and the remaining portion was used as a test piece 8 for evaluating the inward warpage. FIG. 2(a) is a top view of the box-like molded article, FIG. 2(b) is a side view of the same molded article, and FIG. 2(c) is a detailed top view of the box-like molded article. The resulting molded article was left to stand in an environment at 23% and 50% RH for 24 hours. Then, the amount of inward collapse of the side 6 the farthest from the side having the pin gate 5 of the molded article, that is, the dimensions of the largest recess from the original plane was measured five times using a three-dimensional measurement device (CRYSTA-Apex S776) manufactured by Mitutoyo Corp., and the average of the measurements was regarded as the amount of inward warpage 7.

Examples 1 to 11 and Comparative Examples 1 to 7

The polyester resin (A), the metal salt (B), and another raw material(s) were blended in a lump at a blending ratio written in Tables 1 and 2, the glass fiber (C) was supplied through the side feeder, and the resulting mixture was melt-kneaded using a twin screw extruder with L/D=45 under conditions at a cylinder temperature of 260° C. and at the number of rotations of 250 rpm to yield a resin composition in the form of pellets. The resulting resin composition was dried with hot air at 130° C. for three hours, and then injection molded using an injection molding machine SE 100DU manufactured by Sumitomo Heavy Industries, Ltd. at a cylinder temperature of 260° C. and a mold temperature of 80° C. such that the residence time of the resin composition inside the injection molding machine was less than 15 minutes. Thus, molded articles for various items of evaluation were produced. The molded articles for various items of evaluation were used for evaluation as above-mentioned. However, in Comparative Example 2, the resin composition was injection molded with the drying step omitted. In Comparative Example 3, the resin composition underwent residence in the molding machine for 15 minutes after the metering in the injection molding step, and then, was injection molded.

The evaluation results are tabulated in Tables 1 and 2. Table 1 includes Examples 1 to 11, and Table 2 includes Comparative Examples 1 to 7.

TABLE 1

| | | Unit | Example 1 | Example 2 | Example 3 | Example 4 | Example 5 | Example 6 |
|---|---|---|---|---|---|---|---|---|
| (A) Polyester Resin | (A-1) PBT, Carboxyl End Group Amount, 50 eq/t | parts by mass | 100 | | | | | |
| | (A-2) PBT, Carboxyl End Group Amount, 30 eq/t | parts by mass | | 100 | | | | |
| | (A-3) PBT, Carboxyl End Group Amount, 15 eq/t | parts by mass | | | 100 | | 100 | 100 |
| | (A-4) PBT, Carboxyl End Group Amount, 9 eq/t | parts by mass | | | | 100 | | |
| (B) Metal Salt | (B-1) Sodium Propionate | parts by mass | 0.7 | 0.7 | 0.7 | 0.7 | | |
| | (B-2) Sodium Caprylate | parts by mass | | | | | 1.4 | |
| | (B-3) Sodium Stearate | parts by mass | | | | | | 2.9 |
| | (B-4) Potassium Stearate | parts by mass | | | | | | |
| | (B-5) Magnesium Stearate | parts by mass | | | | | | |
| (C) Glass Fiber | (C-1) Round GF (Flatness Ratio, 1) | parts by mass | 42.9 | 42.9 | 42.9 | 42.9 | 42.9 | 42.9 |
| | (C-2) Flat GF (Flatness Ratio, 2) | parts by mass | | | | | | |
| | (C-3) Flat GF (Flatness Ratio, 4) | parts by mass | | | | | | |
| Molding Conditions | Drying Conditions | °C./hour | 130/3 | 130/3 | 130/3 | 130/3 | 130/3 | 130/3 |
| | Melt Residence Time | minutes | 1.5 | 1.5 | 1.5 | 1.5 | 1.5 | 1.5 |
| Crystallinity | | % | 16 | 17 | 22 | 24 | 22 | 22 |
| Average Length of Linear Structures | | nm | 124 | 121 | 108 | 95 | 106 | 107 |
| Carboxyl End Group Amount of Polyester Resin (A) | | eq/t | 126 | 102 | 87 | 82 | 88 | 89 |
| Metal Component Amount of Polyester Resin Composition | | eq/t | 71 | 74 | 75 | 78 | 86 | 89 |
| Metal Component Amount/Carboxyl End Group Amount | | — | — | 0.56 | 0.73 | 0.86 | 0.95 | 0.98 | 1.00 |
| Laser Transmitting Properties | Transmittance | % | 25 | 27 | 30 | 40 | 30 | 30 |
| | Ratio of Variation in Transmittance | % | 8.0 | 7.4 | 3.4 | 2.5 | 3.4 | 3.4 |
| Mechanical Characteristics | Tensile Strength | MPa | 115 | 115 | 115 | 115 | 110 | 100 |
| Dimensional Characteristics | Amount of Inward Warpage | mm | 0.49 | 0.47 | 0.45 | 0.41 | 0.45 | 0.45 |

| | | Unit | Example 7 | Example 8 | Example 9 | Example 10 | Example 11 |
|---|---|---|---|---|---|---|---|
| (A) Polyester Resin | (A-1) PBT, Carboxyl End Group Amount, 50 eq/t | parts by mass | | | | | 100 |
| | (A-2) PBT, Carboxyl End Group Amount, 30 eq/t | parts by mass | | | | | |
| | (A-3) PBT, Carboxyl End Group Amount, 15 eq/t | parts by mass | 100 | 100 | 100 | 100 | |
| | (A-4) PBT, Carboxyl End Group Amount, 9 eq/t | parts by mass | | | | | |
| (B) Metal Salt | (B-1) Sodium Propionate | parts by mass | | | 0.7 | 0.7 | 0.7 |
| | (B-2) Sodium Caprylate | parts by mass | | | | | |
| | (B-3) Sodium Stearate | parts by mass | | | | | |
| | (B-4) Potassium Stearate | parts by mass | 6.0 | | | | |
| | (B-5) Magnesium Stearate | parts by mass | | 10.9 | | | |
| (C) Glass Fiber | (C-1) Round GF (Flatness Ratio, 1) | parts by mass | 42.9 | 42.9 | | | |
| | (C-2) Flat GF (Flatness Ratio, 2) | parts by mass | | | 42.9 | | |
| | (C-3) Flat GF (Flatness Ratio, 4) | parts by mass | | | | 42.9 | |
| Molding Conditions | Drying Conditions | °C./hour | 130/3 | 130/3 | 130/3 | 130/3 | 130/3 |
| | Melt Residence Time | minutes | 1.5 | 1.5 | 1.5 | 1.5 | 1.5 |
| Crystallinity | | % | 16 | 16 | 22 | 22 | 16 |
| Average Length of Linear Structures | | nm | 134 | 138 | 108 | 109 | 123 |
| Carboxyl End Group Amount of Polyester Resin (A) | | eq/t | 83 | 82 | 88 | 87 | 126 |
| Metal Component Amount of Polyester Resin Composition | | eq/t | 186 | 187 | 73 | 74 | 76 |
| Metal Component Amount/Carboxyl End Group Amount | | — | 2.24 | 2.28 | 0.83 | 0.85 | 0.60 |
| Laser Transmitting Properties | Transmittance | % | 25 | 25 | 35 | 30 | 30 |
| | Ratio of Variation in Transmittance | % | 8.0 | 8.0 | 2.9 | 3.4 | 3.4 |
| Mechanical Characteristics | Tensile Strength | MPa | 95 | 85 | 125 | 120 | — |
| Dimensional Characteristics | Amount of Inward Warpage | mm | 0.49 | 0.49 | 0.43 | 0.40 | — |

TABLE 2

|  |  | Unit | Comparative Example 1 | Comparative Example 2 | Comparative Example 3 | Comparative Example 4 |
|---|---|---|---|---|---|---|
| (A) Polyester Resin | (A-1) PBT, Carboxyl End Group Amount, 50 eq/t | parts by mass | 100 | 100 | 100 |  |
|  | (A-2) PBT, Carboxyl End Group Amount, 30 eq/t | parts by mass |  |  |  | 100 |
|  | (A-3) PBT, Carboxyl End Group Amount, 15 eq/t | parts by mass |  |  |  |  |
| (B) Metal Salt | (B-1) Sodium Propionate | parts by mass | 0.4 | 0.7 | 0.7 |  |
|  | (B-2) Sodium Caprylate | parts by mass |  |  |  | 0.7 |
|  | (B-6) Sodium Formate | parts by mass |  |  |  |  |
|  | (B-7) Sodium Polyacrylate | parts by mass |  |  |  |  |
| (C) Glass Fiber | (C-1) Round GF (Flatness Ratio, 1) | parts by mass | 42.9 | 42.9 | 42.9 | 42.9 |
| Molding Conditions | Drying Conditions | °C./hour | 130/3 | —/— | 130/3 | 130/3 |
|  | Melt Residence Time | minutes | 1.5 | 1.5 | 15 | 1.5 |
| Crystallinity |  | % | 5 | 5 | 6 | 9 |
| Average Length of Linear Structures |  | nm | 208 | 214 | 210 | 195 |
| Carboxyl End Group Amount of Polyester Resin (A) |  | eq/t | 92 | 163 | 156 | 72 |
| Metal Component Amount of Polyester Resin Composition |  | eq/t | 39 | 72 | 69 | 42 |
| Metal Component Amount/Carboxyl End Group Amount |  | — | 0.42 | 0.44 | 0.44 | 0.58 |
| Laser Transmitting Properties | Transmittance | % | 15 | 15 | 16 | 16 |
|  | Ratio of Variation in Transmittance | % | 20.5 | 20.5 | 18.4 | 18.4 |
| Mechanical Characteristics | Tensile Strength | MPa | 125 | 85 | 90 | 125 |
| Dimensional Characteristics | Amount of Inward Warpage | mm | 0.56 | 0.57 | 0.56 | 0.56 |

|  |  | Unit | Comparative Example 5 | Comparative Example 6 | Comparative Example 7 |
|---|---|---|---|---|---|
| (A) Polyester Resin | (A-1) PBT, Carboxyl End Group Amount, 50 eq/t | parts by mass |  |  | 100 |
|  | (A-2) PBT, Carboxyl End Group Amount, 30 eq/t | parts by mass |  |  |  |
|  | (A-3) PBT, Carboxyl End Group Amount, 15 eq/t | parts by mass | 100 | 100 |  |
| (B) Metal Salt | (B-1) Sodium Propionate | parts by mass |  |  | 0.4 |
|  | (B-2) Sodium Caprylate | parts by mass |  |  |  |
|  | (B-6) Sodium Formate | parts by mass | 0.5 |  |  |
|  | (B-7) Sodium Polyacrylate | parts by mass |  | 0.7 |  |
| (C) Glass Fiber | (C-1) Round GF (Flatness Ratio, 1) | parts by mass | 42.9 | 42.9 |  |
| Molding Conditions | Drying Conditions | °C./hour | 130/3 | 130/3 | 130/3 |
|  | Melt Residence Time | minutes | 1.5 | 1.5 | 1.5 |
| Crystallinity |  | % | 13 | 10 | 5 |
| Average Length of Linear Structures |  | nm | 174 | 179 | 211 |
| Carboxyl End Group Amount of Polyester Resin (A) |  | eq/t | 72 | 68 | 92 |
| Metal Component Amount of Polyester Resin Composition |  | eq/t | 71 | 72 | 39 |
| Metal Component Amount/Carboxyl End Group Amount |  | — | 0.99 | 1.06 | 0.42 |
| Laser Transmitting Properties | Transmittance | % | 20 | 18 | 20 |
|  | Ratio of Variation in Transmittance | % | 15.3 | 17.0 | 15.3 |
| Mechanical Characteristics | Tensile Strength | MPa | 120 | 125 | — |
| Dimensional Characteristics | Amount of Inward Warpage | mm | 0.51 | 0.52 | — |

The results in Tables 1 and 2 have revealed the following.

Compared to Comparative Examples 1 to 7, Examples 1 to 11 made it possible that using a specific value as the crystallinity of the polyester resin composition yielded a polyester resin composition having excellent injection moldability, high laser transmitting properties controlled at different parts of the molded article to a high degree, and excellent dimensional characteristics. In addition, containing the polyester resin (A), the metal salt (B), and the glass fiber (C) in specific amounts made it possible to obtain a molded article having good injection moldability and additionally having excellent laser transmitting properties, mechanical characteristics, and dimensional characteristics. According to more detailed description, Example 1, compared to Comparative Example 1, allowed the ratio expressed by the metal component amount/the carboxyl end group amount to be in a preferable range, contained a metal component in a preferable range with respect to the weight of the polyester resin (A), and thus, had excellent crystal nucleation efficiency and a crystallinity of 15% or more. As a result, the Example made it possible to obtain a molded article having good injection moldability and, in addition, excellent laser transmitting properties and dimensional characteristics. In addition, Example 1, compared to Comparative Examples 2 and 3, allowed molding under preferable conditions, allowed the ratio expressed by the metal component amount/the carboxyl end group amount to be in a more preferable range, and thus, had excellent crystal nucleation efficiency and a crystallinity of 15% or more. As a result, the Example made it possible to obtain a molded article having good injection moldability and, in addition, excellent laser transmitting properties, mechanical characteristics, and dimensional characteristics. Compared to Comparative Examples 5 and 6, Examples 3, 5, and 6 contained the metal salt (B) having a carbon number preferable from the viewpoint of excellent affinity with the polyester resin (A), and thus, had excellent crystal nucleation efficiency and a crystallinity of 15% or more. As a result, the Examples made it possible to obtain a molded article having good injection moldability and, in addition, excellent laser transmitting properties and dimensional characteristics. Compared to Comparative Example 7, Example 11 allowed the ratio expressed by the metal component amount/the carboxyl end group amount to be in a preferable range, and thus, had excellent crystal nucleation efficiency and a crystallinity of 15% or more. As a result, the Example made it possible to obtain a molded article having good injection moldability and, in addition, excellent laser transmitting properties. Compared to Example 1, Examples 2, 3, and 4 allowed the ratio expressed by the metal component amount/the carboxyl end group amount to be in a more preferable range, and thus, had excellent crystal nucleation efficiency, consequently making it possible to obtain a molded article having good injection moldability and additionally obtain excellent laser transmitting properties and dimensional characteristics. Compared to Example 2, Examples 3 and 4 allowed the ratio expressed by the metal component amount/the carboxyl end group amount to be in a more preferable range, and thus, had excellent crystal nucleation efficiency, consequently making it possible to obtain a molded article having good injection moldability and additionally obtain more excellent laser transmitting properties and dimensional characteristics. Compared to Example 3, Example 4 allowed the ratio expressed by the metal component amount/the carboxyl end group amount to be in a particularly preferable range, and thus, had excellent crystal nucleation efficiency, consequently making it possible to obtain a molded article having good injection moldability and additionally obtain more excellent laser transmitting properties and dimensional characteristics. Compared to Examples 5 and 6, Example 3 contained the metal salt (B) having a carbon number more preferable from the viewpoint of excellent affinity with the polyester resin (A), and thus, had excellent crystal nucleation efficiency, consequently making it possible to obtain a molded article having more excellent mechanical characteristics. Compared to Examples 7 and 8, Examples 3, 5, and 6 contained the metal salt (B) of a preferable metal species, and thus, had excellent crystal nucleation efficiency, consequently making it possible to obtain a molded article having good injection moldability and additionally obtain more excellent laser transmitting properties, mechanical characteristics, and dimensional characteristics. Compared to Example 3 and Example 10, Example 9 contained the glass fiber (C) having a more preferable flatness ratio, and consequently made it possible to obtain a molded article having more excellent laser transmitting properties and mechanical characteristics.

The invention claimed is:

1. A composite molded article obtained by laser welding a molded article composed of a polyester resin composition having a crystallinity of 15% or more as calculated with fast scanning calorimetry by a calculation method, wherein the calculation method comprises using fast scanning calorimetry, said polyester resin composition is heated from 30° C. to 260° C. at 10000° C./second, then maintained at 260° C. for 0.1 second, then cooled to 80° C. at 5000° C./second, maintained at 80° C. for 0.1 second, then cooled to −70° C. at 5000° C./second, and then heated to 260° C. at 1000° C./second, after which the curve obtained is used to calculate said crystallinity, wherein said polyester resin composition comprises a polyester resin (A) as a main component and contains a metal component and glass fiber (C) in an amount of more than 0 part by mass and 100 parts by mass or less, with respect to 100 parts by mass of said polyester resin (A), wherein, with respect to a carboxyl end group amount of said polyester resin (A) and a metal component amount contained in said resin composition, a ratio expressed by said metal component amount/said carboxyl end group amount is 0.86 or more, and wherein an amount of inward warpage of the molded article is 0.45 mm or less, the inward warpage being measured by forming the polyester resin composition into a box-like test piece having a bottom square having a side length L2 of 30 mm, a height H2 of 30 mm and a thickness D2 of 1.5 mm, molding under conditions including a cylinder temperature of 260° C. and a mold temperature of 80° C. where a sprue and runner were cut off at a pin gate, and a remaining portion was used as the test piece, and exposing the molded article to an environment at 23% and 50% RH for 24 hours, and measuring the amount of inward collapse of the side the farthest from the side having the pin gate of the molded article.

2. The composite molded article according to claim 1, wherein the average longitudinal length of linear structures derived from a crystal structure of the polyester resin (A) in said polyester resin composition is 150 nanometers or less as observed using a transmission electron microscope.

3. The composite molded article according to claim 1, wherein said metal component is an alkali metal.

4. The composite molded article according to claim 1, wherein said metal component is at least one selected from sodium, potassium, and mixtures thereof.

5. The composite molded article according to claim 1, wherein the metal component comprises a metal salt (B) having a metal component concentration of 50 to 150 millimoles with respect to 1 kg of said polyester resin (A).

6. The composite molded article according to claim 5, wherein the carboxyl end group concentration of said polyester resin (A) is 20 eq/t or less.

7. The composite molded article according to claim 5, wherein said metal salt (B) is an aliphatic sodium carboxylate salt that is at least one selected from sodium propionate, sodium caprylate, sodium stearate, and mixtures thereof.

8. A method of producing the molded article composed of the polyester resin composition according to claim 1, the method comprising drying said polyester resin composition at 100° C. or more for three hours or more; and then molding the composition.

9. The method of producing said molded article according to claim 8, wherein a melt residence time of said polyester resin composition is less than 15 minutes.

* * * * *

UNITED STATES PATENT AND TRADEMARK OFFICE
CERTIFICATE OF CORRECTION

PATENT NO. : 11,578,185 B2
APPLICATION NO. : 17/608575
DATED : February 14, 2023
INVENTOR(S) : Yoshimura et al.

It is certified that error appears in the above-identified patent and that said Letters Patent is hereby corrected as shown below:

In the Claims

<u>In Claim 1</u>
At Column 25, Line 61, please change "15%" to --20%--; and at Column 26, Line 18, after "more" please insert --and 2.0 or less--.

Signed and Sealed this
Twenty-seventh Day of August, 2024

Katherine Kelly Vidal
*Director of the United States Patent and Trademark Office*